(12) United States Patent
Shen

(10) Patent No.: US 11,943,778 B2
(45) Date of Patent: Mar. 26, 2024

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Jia Shen, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 583 days.

(21) Appl. No.: 17/158,477

(22) Filed: Jan. 26, 2021

(65) Prior Publication Data

US 2021/0153178 A1   May 20, 2021

Related U.S. Application Data

(63) Continuation of application No. PCT/CN2018/098482, filed on Aug. 3, 2018.

(51) Int. Cl.
*H04W 72/23* (2023.01)
*H04W 8/24* (2009.01)
*H04W 72/0446* (2023.01)

(52) U.S. Cl.
CPC ........... *H04W 72/23* (2023.01); *H04W 8/245* (2013.01); *H04W 72/0446* (2013.01)

(58) Field of Classification Search
CPC .. H04W 72/23; H04W 8/245; H04W 72/0446
See application file for complete search history.

(56) References Cited

U.S. PATENT DOCUMENTS

2019/0159213 A1* 5/2019 Baldemair ............ H04L 5/0094
2019/0387543 A1* 12/2019 Karaki .................. H04L 1/0003

FOREIGN PATENT DOCUMENTS

CN   108111281 A   6/2018

OTHER PUBLICATIONS

ETRI. "R I-1806668, Remaining Issues on DL Data Multiplexing with Different Reliability Requirements" 3GPP TSG RAN WGJ Meeting #93, May 25, 2018 (May 25, 2018), entire document (3 pages).
Huawei et al. "RI-1803709, Remaining Issues on Resource Allocation and TBS" 3GPP TSG RAN WGJ Meeting #92bis, Apr. 20, 2018 (Apr. 20, 2018), section 3 (9 pages).

(Continued)

*Primary Examiner* — Samina F Choudhry
(74) *Attorney, Agent, or Firm* — Perkins Coie LLP

(57) ABSTRACT

Provided are a wireless communication method, terminal device, and network device, capable of scrambling a radio network temporary identifier (RNTI) of downlink control information (DCI) and thereby giving a terminal device a reference point for an initial position of a resource used by a flexible configuration channel, said method comprising: a terminal device receives DCI sent by a network device; according to an RNTI which scrambles said DCI, said terminal device determines, in at least one resource table, a resource used for a first channel, said at least one resource table containing at least two types of resources, the reference points of the initial positions of said at least two types of resources being different.

16 Claims, 7 Drawing Sheets

(56) References Cited

OTHER PUBLICATIONS

Huawei et al. "RI-1805902, DCI Design for URLLC" 3GPP TSG RAN WGJ Meeting #93, May 25, 2018 (May 25, 2018), section 2 (3 pages).
International Search Report dated Feb. 27, 2019 of PCT/CN2018/098482 (5 pages).
OPPO. "RP-180836, Considerations on Other Miscellaneous NR Enhancements/Leftover" 3GPP TSG RAN Meeting #80, Jun. 14, 2018 (Jun. 14, 2018), entire document (4 pages).
AT&T "On DCI contents and formats" R1-1719643; 3GPP TSG RAN WG1 Meeting 91; Reno, USA; Nov. 27-Dec. 1, 2017; 9 pages.
EPO, Extended European Search Report for European Application No. 18928454.0, dated Jul. 2, 2021. 11 pages.
Ericsson "DL/UL resources allocation" R1-1805188; 3GPP TSG-RAN1 #92bis; Sanya, China; Apr. 16-20, 2018. 15 pages.
Ericsson "Outcome of offline discussion on 7.1.3.1.4 (DCI content)—part III" R1-1807817; TSG-RAN WG1 #93; Busan, Korea; May 21-25, 2018; 11 pages.
Ericsson "Summary of 7.1.3.3.1 (resource allocation)" R1-1805505; TSG-RAN WG1 #92bis; Sanya, China; Apr. 16-20, 2018. 15 pages.
Examination report of the EP application No. 18928454.0, dated Apr. 25, 2023. 7 pages.

\* cited by examiner

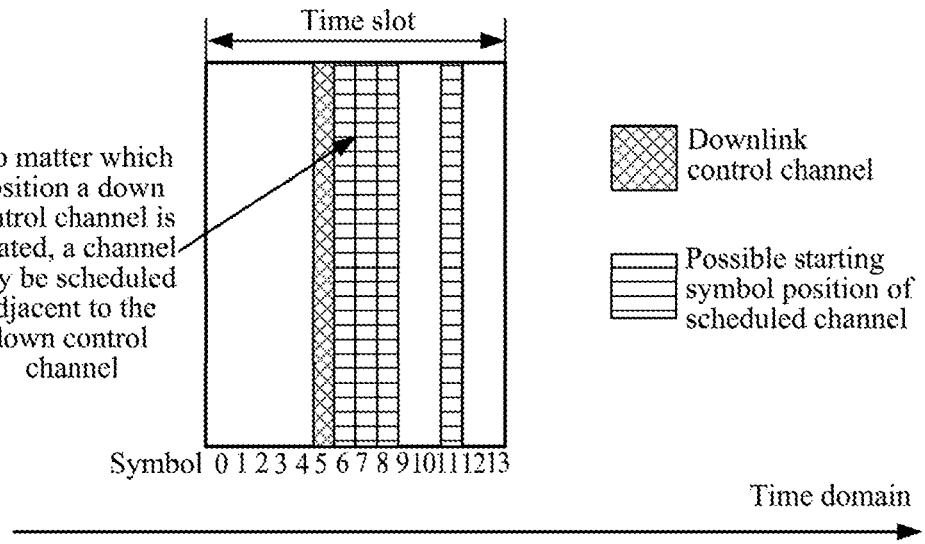

A terminal device receives Downlink Control Information (DCI) sent by a network device — 210

The terminal device determines a resource for a first channel in at least one resource table according to a Radio Network Temporary Identity (RNTI) for scrambling the DCI, wherein the at least one resource table contains at least two types of resources, and reference points of starting positions of the at least two types of resources are different — 220

FIG. 4

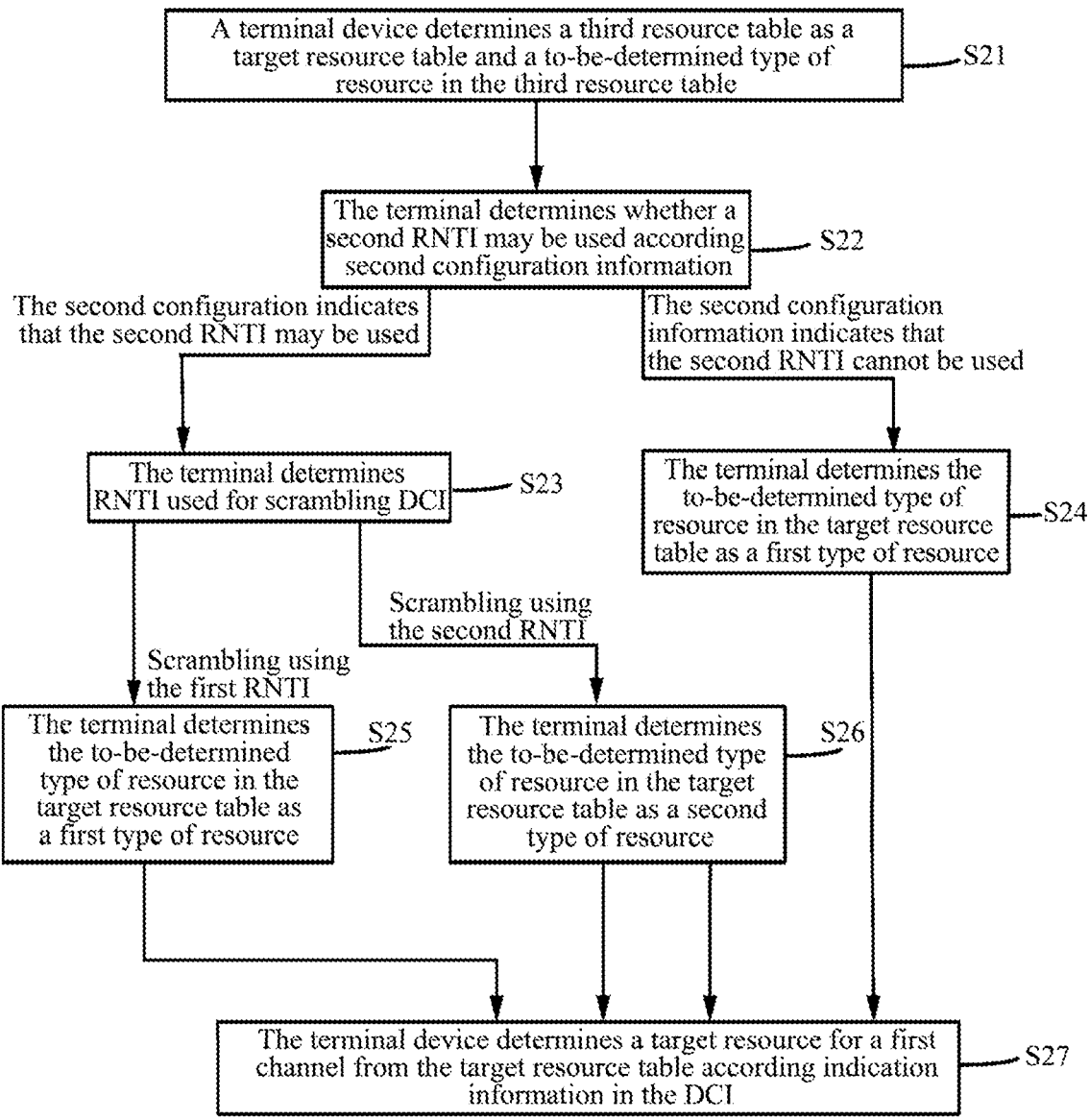

FIG. 8

A network device sends Downlink Control Information (DCI) scrambled by using a target Radio Network Temporary Identity (RNTI) to a terminal device, wherein the target RNTI is used for the terminal device to determine a resource for a first channel in at least one resource table, the at least one resource table contains at least two types of resources, and reference points of starting positions of the at least two types of resources are different

FIG. 9

WIRELESS COMMUNICATION METHOD, TERMINAL DEVICE, AND NETWORK DEVICE

CROSS-REFERENCE TO RELATED APPLICATIONS

The present disclosure is a continuation application of International PCT Application No. PCT/CN2018/098482, having an international filing date of Aug. 3, 2018, the contents of the above-identified application is hereby incorporated by reference.

TECHNICAL FIELD

Implementations of the present application relate to the field of communication, and more particularly to a method for wireless communication, a terminal device, and a network device.

BACKGROUND

In a Long Term Evolution (LTE) system, a time domain position of a data channel (such as a Physical Downlink Shared Channel (PDSCH)) is in units of a time slot and a subframe. A position of a starting point of a PDSCH is relative to a time slot/subframe in which it is located, and the Physical Control Format Indicator Channel (PCFICH) of the time slot/subframe indicates that the PDSCH starts from a first symbol of the time slot/subframe.

In a 5G New Radio (NR) system, in order to improve flexibility of resource allocation, a time domain position of a channel may be allocated in units of a symbol. In this case, how to determine a reference point of a starting position of the channel to determine a resource used by the channel is an urgent problem to be solved.

SUMMARY

Implementations of the present application provide a method for wireless communication, a terminal device and a network device, which may realize determining a resource for a channel transmission according to an RNTI for scrambling DCI.

In a first aspect, a method for wireless communication is provided, including: receiving, by a terminal device, Downlink Control Information (DCI) sent by a network device; and determining, by the terminal device, a resource for a first channel in at least one resource table according to a Radio Network Temporary Identity (RNTI) for scrambling the DCI, wherein the at least one resource table contains at least two types of resources, and a type of the resource is used for indicating a reference point of a starting position of the resource.

In a second aspect, a method for wireless communication is provided, including: sending, by a network device, Downlink Control Information (DCI) scrambled by using a target Radio Network Temporary Identity (RNTI) to a terminal device, wherein the target RNTI is used for the terminal device to determine a resource for a first channel in at least one resource table, the at least one resource table contains at least two types of resources, and reference points of starting positions of the at least two types of resources are different.

In a third aspect, a terminal device is provided, configured to perform the method in the above first aspect or any possible implementation of the first aspect. Specifically, the terminal device includes units for performing the method in the above first aspect or any possible implementation of the first aspect.

In a fourth aspect, a network device is provided, configured to perform the method in the above second aspect or any possible implementation of the second aspect. Specifically, the network device includes units for performing the method in the above second aspect or any possible implementation of the second aspect.

In a fifth aspect, a terminal device is provided, including a processor and a memory. The memory is configured to store a computer program, and the processor is configured to call and run the computer program stored in the memory to execute the method in the above first aspect or each implementation thereof.

In a sixth aspect, a network device is provided, including a processor and a memory. The memory is configured to store a computer program, and the processor is configured to call and run the computer program stored in the memory to execute the method in the above second aspect or each implementation thereof.

In a seventh aspect, a chip is provided, configured to implement the method in any one of the above first to second aspects or each implementation thereof.

Specifically, the chip includes a processor, configured to call and run a computer program from a memory, so that a device on which the chip is installed performs the method in any one of the above first to second aspects or each implementation thereof.

In an eighth aspect, a computer-readable storage medium is provided, configured to store a computer program that causes a computer to perform the method in any one of the above first to second aspects or each implementation thereof.

In a ninth aspect, a computer program product is provided, including computer program instructions that cause a computer to perform the method in any one of the first to second aspects or each implementation thereof.

In a tenth aspect, a computer program is provided, which, when running on a computer, causes a computer to perform the method in any one of the above first to second aspects or each implementation thereof.

Based on the technical solution, by configuring at least one resource table including at least two types of resources to the terminal device, the network device may flexibly configure the resource for the first channel transmission through the RNTI. For example, the network device may flexibly configure, through the RNTI, the resource for the first channel according to a type of service to be transmitted on the first channel which is beneficial to meet a transmission requirement of different types of services. Meanwhile, by configuring different resources to different types of services, resource allocation of different types of services may be optimized, which is conducive to improving resource utilization rate of a communication system.

BRIEF DESCRIPTION OF DRAWINGS

FIG. 3 is another schematic diagram of a position of a starting symbol of a time domain resource.

FIG. 4 is a schematic flowchart of a method for wireless communication according to an implementation of the present application.

FIG. 8 is another example of a schematic flowchart of a method for wireless communication according to an implementation of the present application.

FIG. 9 is a schematic diagram of a method for wireless communication according to another implementation of the present application.

DETAILED DESCRIPTION

Technical solutions in implementations of the present application will be described below with reference to the drawings in implementations of the present application. It is apparent that the implementations described are a part of implementations of the present application, but not all implementations. According to the implementations of the present application, all other implementations achieved by a person of ordinary skill in the art without paying an inventive effort are within the protection scope of the present application.

The technical solutions of the implementations of the present application may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, or a 5G system, etc.

Figure 1:
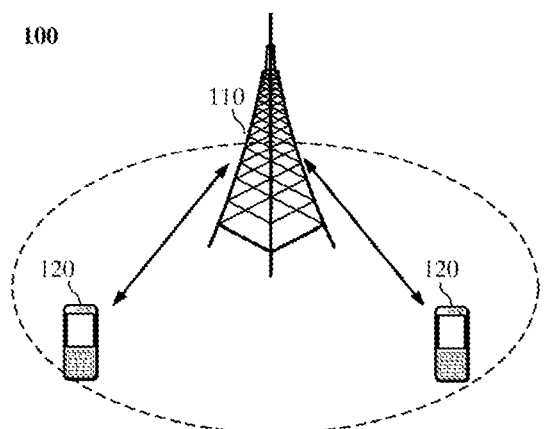
FIG. 1 is a schematic diagram of architecture of a communication system according to an implementation of the present application.

Illustratively, a communication system 100 applied in an implementation of the present application is shown in FIG. 1. The communication system 100 may include a network device 110, and the network device 110 may be a device that communicates with a terminal device 120 (or referred to as a communication terminal, or a terminal). The network device 110 may provide communication coverage for a specific geographical area, and may communicate with terminal devices located within the coverage area. Optionally, the network device 110 may be a Base Transceiver Station (BTS) in a GSM system or a CDMA system, a NodeB (NB) in a WCDMA system, an Evolutional Node B (eNB or eNodeB) in an LTE system, or a radio controller in a Cloud Radio Access Network (CRAN), or the network device may be a mobile switch center, a relay station, an access point, a vehicle-mounted device, a wearable device, a hub, a switch, a bridge, a router, or a network side device in a 5G network, or a network device in a future evolved Public Land Mobile Network (PLMN), etc.

The communication system 100 also includes at least one terminal device 120 located within the coverage area of the network device 110. As used herein, the term "terminal device" includes, but not limited to, a device configured to receive/send a communication signal via a wired circuit, for example, via Public Switched Telephone Networks (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a DVB-H network, a satellite network, and an AM-FM broadcast sender; and/or another terminal device; and/or an Internet of Things (IoT) device. A terminal device configured to communicate via a wireless interface may be referred to as a "wireless communication terminal", a "wireless terminal" or a "mobile terminal". Examples of the mobile terminal include, but not limited to, a satellite or a cellular telephone, a Personal Communication System (PCS) terminal that may combine with a cellular radio telephone and data processing, faxing, and data communication abilities, a PDA that may include a radio telephone, a pager, an Internet/intranet access, a Web browser, a memo pad, a calendar, and/or a Global Positioning System (GPS) receiver, and a conventional laptop and/or palmtop receiver or another electronic apparatus including a radio telephone transceiver. The terminal device may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved PLMN, or the like.

Optionally, terminal direct connection (Device to Device, D2D) communication may be performed between the terminal devices 120.

Optionally, the 5G system or the 5G network may also be referred to as a New Radio (NR) system or an NR network.

FIG. 1 shows one network device and two terminal devices as an example. Optionally, the communication system 100 may include multiple network devices, and other quantity of terminal devices may be included within the coverage area of each network device, and this is not limited in the implementations of the present application.

Optionally, the communication system 100 may also include another network entity such as a network controller, a mobile management entity, etc., which is not restricted in implementations of the present application.

It should be understood that, a device with a communication function in a network/system in the implementation of the present application may be referred to as a terminal device. Taking the communication system 100 shown in FIG. 1 as an example, the terminal device may include a network device 110 and a terminal device 120 which have communication functions, and the network device 110 and the terminal device 120 may be the specific devices described above, which will not be repeated here again. The terminal device may also include another device in the communication system 100, such as a network controller, a mobile management entity, or another network entity, which is not restricted in the implementations of the present application. It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

In the 5G system, in order to improve flexibility of resource allocation and reduce delay, a time domain position of a channel may be allocated in units of a symbol. Specifically, a time domain resource for a channel may be indicated by an indication mode of "a starting symbol+a quantity of symbols". For a reference point of a starting position of the time domain resource, following solutions may be adopted:

Solution 1: taking a starting position of a time slot as the reference point of the starting position of the time domain resource, that is, the starting position of the time domain resource is calculated relative to a starting position of a time slot.

Solution 2: taking a position of a downlink control channel as the reference point of the starting position of the time domain resource, that is, the starting position of the time domain resource is calculated relative to a position of a downlink control channel.

Figure 2:
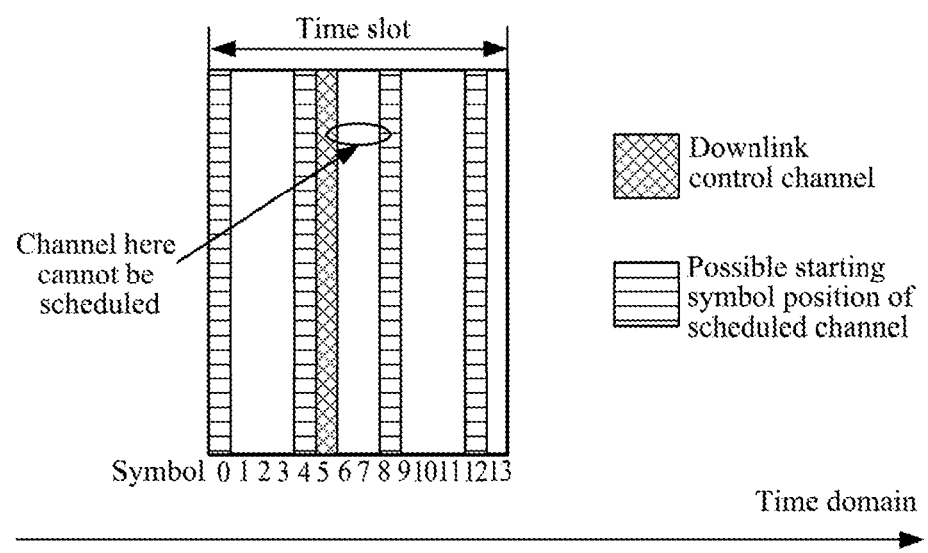
FIG. 2 is a schematic diagram of a position of a starting symbol of a time domain resource.

For the above solution 1, there may be a problem that scheduling of low-latency services cannot be effectively realized. Specifically, a scheduled channel is usually located behind the downlink control channel that schedules this channel. Since where the downlink control channel is located in the time slot is unknown, possible positions of a starting symbol can only be distributed within one time slot as uniformly as possible, that is, reference points of the starting position are uniformly distributed within one time slot. As shown in FIG. 2, four possible positions of the starting symbol may be uniformly set within one time slot. In this case, when the downlink control channel is located at certain positions in the time slot, such as positions of a downlink control channel in FIG. 2, since the scheduled channel cannot be transmitted close to the downlink control channel, scheduling of a low-latency service cannot be realized.

For the solution 2, when the downlink control channel is located at any position in the time slot, the starting symbol of the scheduled channel may be configured at a position close to the downlink control channel, as shown in FIG. 3. However, the solution 2 cannot realize effectively scheduling a channel farther from the downlink control channel. For example, a time interval between the starting symbol of the scheduled channel and the downlink control channel exceeds one time slot. In this case, if this solution 2 is adopted, overhead of control signaling will be caused to increase.

In view of this, an implementation of the present application provides a method for wireless communication, in which a terminal device can determine a reference point of a starting position of a time domain resource of a scheduled channel according to a Radio Network Temporary Identity (RNTI) used for scrambling Downlink Control Information (DCI), so that flexibly configuring reference points of different time domain resources without increasing DCI overhead can be realized, which is beneficial to meet requirements of different types of services.

Hereinafter, the method for wireless communication according to implementations of the present application will be explained with reference to FIGS. 4 to 9. It should be understood that FIGS. 4 to 9 show main acts or operations of the wireless communication method according to implementations of the present application, but these acts or operations are only examples, and implementations of the present application may also perform other operations or variations of various operations of FIGS. 4 to 9. In addition, various acts in the method implementation of present application may also be performed in different orders as described in the method implementation, and it is possible that not all operations in the method implementation need to be performed.

FIG. 4 is a schematic flowchart of a method for wireless communication according to an implementation of the present application. As shown in FIG. 4, the method 200 includes following contents.

In S210, a terminal device receives Downlink Control Information (DCI) sent by a network device.

In S220, the terminal device determines a resource for a first channel in at least one resource table according to a Radio Network Temporary Identity (RNTI) for scrambling the DCI, wherein the at least one resource table contains at least two types of resources, and reference points of starting positions of the at least two types of resources are different.

Optionally, in an implementation of the present application, the first channel may be a Physical Uplink Shared Channel (PUSCH), a Physical Downlink Shared Channel (PDSCH), or another data channel, which is not limited in implementations of the present application.

As an example and not limitation, the resource in the at least one resource table may be represented by at least one of following parameters: a starting symbol, a length, an ending symbol and a mapping type.

It should be understood that in an implementation of the present application, at least two types of resources may be included in the at least one resource table, and the at least two types of resources may be located in a same resource table or different resource tables, which is not limited by implementations of the present application. The at least two types of resources respectively correspond to reference points of different time domain resources. Optionally, the reference point of the time domain resource may be the reference point of the starting position or a reference point of an ending position, that is to say, the reference points of the starting positions or the ending positions of the at least two types of resources may be different. To simplify the description, the following description will take the reference point of the time domain resource as the reference point of the starting position as an example, but implementations of the present application are not limited to this.

Optionally, in an implementation of the present application, the at least two types of resources include a first type of resource and a second type of resource, wherein the reference point of the starting position of the first type resource may be a starting position of a time slot, in a specific implementation, the first type of resource may be a resource determined using the aforementioned solution 1, and the reference point of the starting position of the second type of resource may be the DCI or the time domain position of a first resource range including the DCI. In a specific implementation, the second type of resource may be a resource determined using the aforementioned solution 2, that is, a position of a downlink control channel is taken as the reference point of the starting position.

It should be understood that the above two types of resources are only examples, and the at least two types of resources may also include a third type of resource. A reference point of a starting position of the third type of resource may be a starting position of a subframe, or a starting position of a radio frame, or a starting position of a radio frame period, etc. This is not limited by implementations of the present application. For convenience of description, hereinafter, the at least two types of resources including the first type of resource and the second type of resource are taken as an example, but implementations of the present application are not limited to this.

Figure 5:
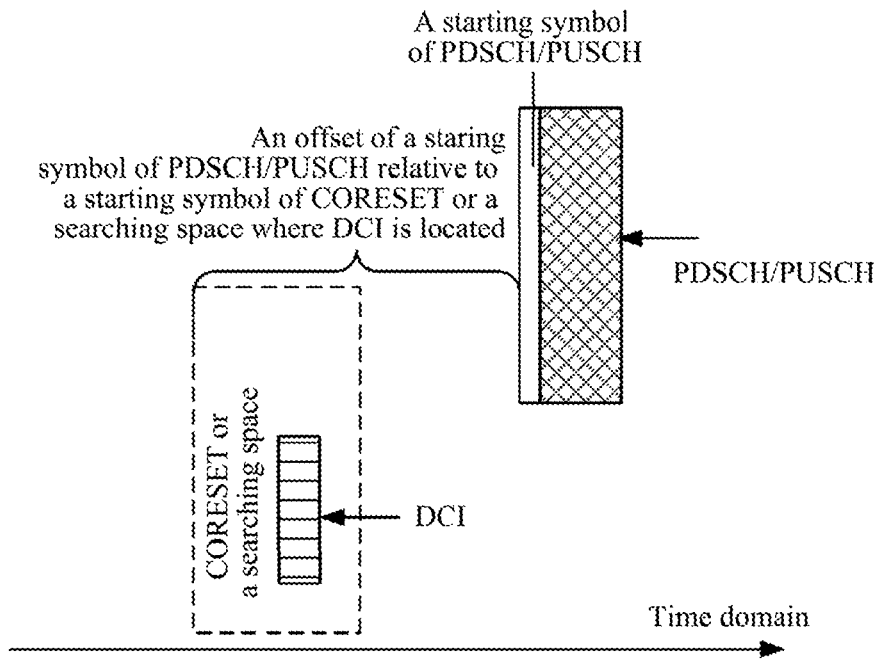
FIG. 5 is an example of a schematic flowchart of a reference point of a starting position of a second type of resource.
Figure 6:
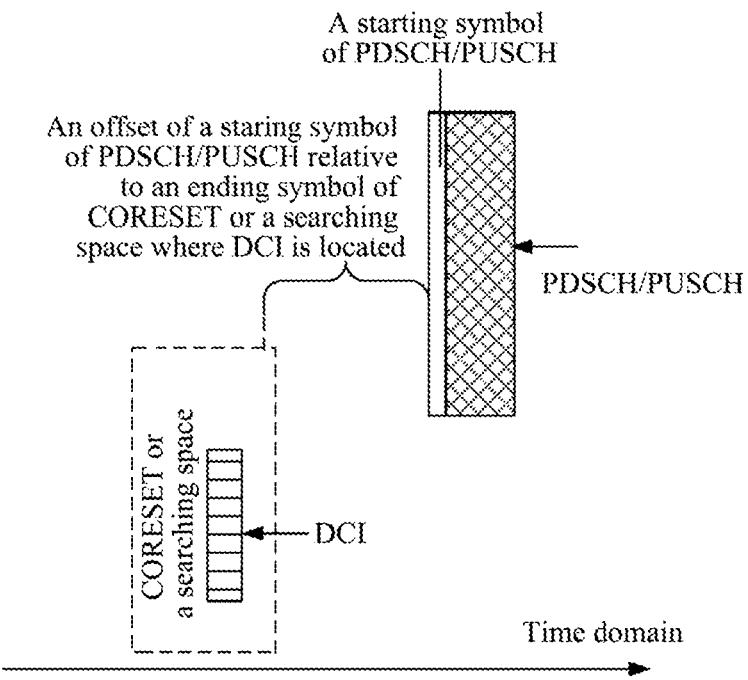
FIG. 6 is another example of a schematic flowchart of a reference point of a starting position of a second type of resource.

Optionally, in some implementations, the time domain position of the first resource range including the DCI may specifically be a starting symbol or an ending symbol of a Control Resource Set (CORESET) or a search space including the DCI. As shown in FIG. 5 and FIG. 6, it is shown respectively that the time domain position of the first resource range including the DCI is the starting symbol and the ending symbol of the CORESET or the search space including the DCI.

That is to say, the starting symbol of the first channel may take the starting symbol or the ending symbol of the CORESET or the search space including DCI scheduling the first channel as the reference point of the starting position of the time domain resource, then in a specific implementation, according to the position of the starting symbol of the CORESET where the DCI is located or the search space, and an offset of the first channel relative to the CORESET where the DCI is located or the starting symbol of the search space, a position of a starting symbol of the first channel may be determined, for example, if the starting symbol of the CORESET where the DCI is located is symbol 2 and the offset is 3, the starting position of the first channel may be determined as symbol 5.

In an implementation of the present application, the terminal device may determine the resource for the first channel by the RNTI used for scrambling the DCI, for example, the starting position and length of the time domain resource of the first channel and the reference point of the starting position of the time domain resource. In a specific implementation, different RNTIs may correspond to different types of resources, that is, different RNTIs may be used for indicating reference points of different starting positions, and the network device may determine the reference point of the starting position of the time domain resource for a service to be transmitted according to a service type of the service to be transmitted, for example, if the service to be transmitted is an Ultra-Reliable and Low Latency Communication (URLLC) service, the network device may determine to use the second type of resource, for example, taking the position of the DCI as the reference point of the starting position; or if the service to be transmitted is Enhance Mobile Broadband (eMBB), the network device may determine to use the first type of resource, for example, taking the starting position of the time slot as the reference point of the starting position. Furthermore, the network device may scramble DCI using the determined RNTI corresponding to the reference point of the starting position, and the terminal device may determine the type of resource for the first channel according to the RNTI used for scrambling the DCI, so that it can be realized that reference points of different time domain resources are dynamically configured for different types of services without increasing DCI overhead, which is conducive to meeting service requirements of different services and improving resource utilization rate of a communication system.

In another optional implementation, the network device may configure the terminal device with a reference point for the starting position of the resource of the first channel through a sending mode of the DCI, where the sending mode of the DCI may refer to a scrambling code sequence used for sending the DCI, that is, RNTI. Of course, it may also be at least one of a beam, an antenna port, a precoding matrix, an Modulation and Coding Scheme (MCS), a Physical Downlink Control Channel (PDCCH) resource, a search space and an aggregation level, used for sending the DCI, or it may also be sequence information such as a mask sequence, a Demodulation Reference Signal (DMRS) sequence, etc. used for processing the DCI, or the like, which is not limited by implementation of the present application. That is to say, the network device may indirectly indicate the type of resource used for a first channel through at least one piece of the above information, so that flexible configuration of the reference point of time domain resource can be realized without increasing additional overhead, which is beneficial to configure appropriate reference points of time domain resources for different services to meet service requirements.

It should be understood that the implementation of implicitly indicating the reference point of the starting position by the sending mode of the DCI is similar to the implementation of indicating the reference point of the starting position by the RNTI. For example, the beams used for sending the DCI may correspond to the reference points of different starting positions respectively, or different mask sequences correspond to the reference points of different starting positions, which is not repeated here.

Optionally, in some implementations, the RNTI used for scrambling the DCI may be a first RNTI or a second RNTI, wherein the first RNTI may be a Cell Radio Network Temporary Identity (C-RNTI), and the second RNTI may be another RNTI except the C-RNTI, for example, a Paging Radio Network Temporary Identity (P-RNTI), etc., which are not limited in implementations of present application.

Optionally, in some implementations, the method 200 may further include: the terminal device receives first configuration information sent by the network device, wherein the first configuration information includes the at least one resource table for determining the resource of the first channel.

That is, the at least one resource table may be configured by the network device, and in another alternative implementation, the at least one resource table may be preset on the terminal device, or it may be agreed by a protocol or determined through negotiation between the network device and the terminal device. Implementations of the present application do not limit an acquisition mode of the at least one resource table.

Optionally, in some implementations, S220 may specifically include: the terminal device determines a target resource table in the at least one resource table and a type of a resource in the target resource table according to the RNTI for scrambling the DCI; the terminal device determines the resource for the first channel in the target resource table according to indication information in the DCI.

Specifically, different RNTIs correspond to different types of resources, or different RNTIs are used for indicating reference points of different starting positions. In some implementations, the at least one resource table may include multiple resource tables (denoted as Case 1), each resource table corresponds to a reference point of a corresponding starting position, and the RNTI may have a corresponding relationship with the multiple resource tables. In this case, the terminal device may determine which resource table to use as well as the type of resource in the resource table according to the RNTI used for scrambling the DCI. In some other implementations, the at least one resource table may only include one resource table (denoted as Case 2). In this case, the resource table may correspond to different types of resources under different RNTIs, that is, the reference points of the starting positions corresponding to the resource in the resource table are different under different RNTIs, so that the terminal device may determine the type of resource in the resource table according to the RNTI used for scrambling the DCI, that is, the reference point of the starting point corresponding to the resource in the resource table. Further, the terminal device may determine which resource in the target resource table is used as the resource of the first channel according to the indication information included in the DCI, so that the first channel may be sent using the resource of the first channel.

Hereinafter, the mode of determining the resource of the first channel in the above Cases 1 and 2 will be specifically explained.

Case 1: the at least one resource table includes a first resource table and a second resource table, wherein the first resource table corresponds to the first RNTI, a resource in the first resource table is the first type of resource, the second resource table corresponds to the second RNTI, and at least one resource in the second resource table is the second type of resource.

That is to say, in Case 1, different resource tables may be configured for different RNTIs, and the resource in the first resource table corresponding to the first RNTI is the first type of resource, that is, the resource in the first resource table takes the starting position of the time slot as the reference point of the time domain resource, and the second resource table corresponding to the second RNTI includes at least one second type of resource. In an alternative implementation, the resources in the second resource table are all the second type of resources, or in another alternative implementation, part of resources in the second resource table are the first type of resources and other resources are the second type of resources. Which resources in the second resource table are the second type of resources may be determined according to configuration of the network device or a preset condition. For example, the network device may configure the resource with a starting symbol within a certain range as the second type of resource, or the preset condition may also be that the resource with a starting symbol smaller than a specific value is the second type of resource, which is not limited by implementations of the present application.

In a first implementation of Case 1, the terminal device determines the target resource table in the at least one resource table and the type of the resource in the target resource table according to the RNTI for scrambling the DCI, including: if the RNTI for scrambling the DCI is the first RNTI, the terminal device determines that the first resource table is the target resource table and the resource in the first resource table is the first type of resource; or if the RNTI for scrambling the DCI is the second RNTI, the terminal device determines that the second resource table is the target resource table, and at least one resource in the second resource table is a candidate second type of resource.

It should be noted that in some implementations, the candidate second type of resource may be the second type of resource, that is, the candidate second type of resource may be directly determined as the second type of resource; or, in some other implementations, the candidate second type of resource may be understood as a to-be-determined type of resource. If a certain condition is met, the candidate second type of resource may be determined as the second type of resource; otherwise, the candidate second type of resource is determined as the first type of resource. For example, when a time-slot-level offset K of the DCI is zero, that is, when the DCI and the first channel are in a same time slot, it may be determined that the candidate second type of resource is the second type of resource; otherwise, it is determined that the candidate second type of resource is the first type of resource. That is to say, whether the resource is the second type of resource still needs to meet a specific additional condition. To simplify the description, the second type of resource is directly used for description below, and this judgment process is omitted.

Specifically, in a case that different RNTIs correspond to different resource tables, the terminal device may determine the target resource table and the type of resource in the target resource table according to the RNTI used for scrambling DCI. For example, if the RNTI is the first RNTI, the terminal device may determine that the first resource table corresponding to the first RNTI is the target resource table and the resource in the first resource table is the first type of resource; or if the RNTI is the second RNTI, the terminal device may determine the second resource table corresponding to the second RNTI as the target resource table, and may further determine which resources in the second resource table are the second type of resources. Then, the target resource in the target resource table may be determined according to the indication information in the DCI, so that the first channel may be transmitted on the target resource.

In some implementations, the first implementation of Case 1 may be based on such a premise that before the terminal device receives the DCI, the terminal device receives second configuration information sent by the network device, wherein the second configuration information is used for indicating that the second RNTI may be used, that is, the first implementation of Case 1 may be the mode of determining the target resource table and the type of resource in the target resource table in a case that the second RNTI may be used.

In a second implementation of Case 1, the terminal device determines the target resource table in the at least one resource table and the type of the resource in the target resource table according to the RNTI for scrambling the DCI, including: the terminal device determines that the first resource table is the target resource table.

That is to say, in a case that different RNTIs correspond to different resource tables, the terminal device may directly determine that the first resource table corresponding to the first RNTI is the target resource table, and the resource in the target resource table is the first type of resource, regardless of which RNTI the RNTI used for scrambling the DCI is.

In some implementations, the second implementation of Case 1 may be based on such a premise that before the terminal device receives the DCI, the terminal device receives the second configuration information sent by the network device, wherein the second configuration information is used for indicating that the second RNTI is not used, or the terminal device does not receive the second configuration information sent by the network device, that is, the second implementation of Case 1 may be the mode of determining the target resource table and the type of resource in the target resource table in a case that the second RNTI is not used.

Figure 7:
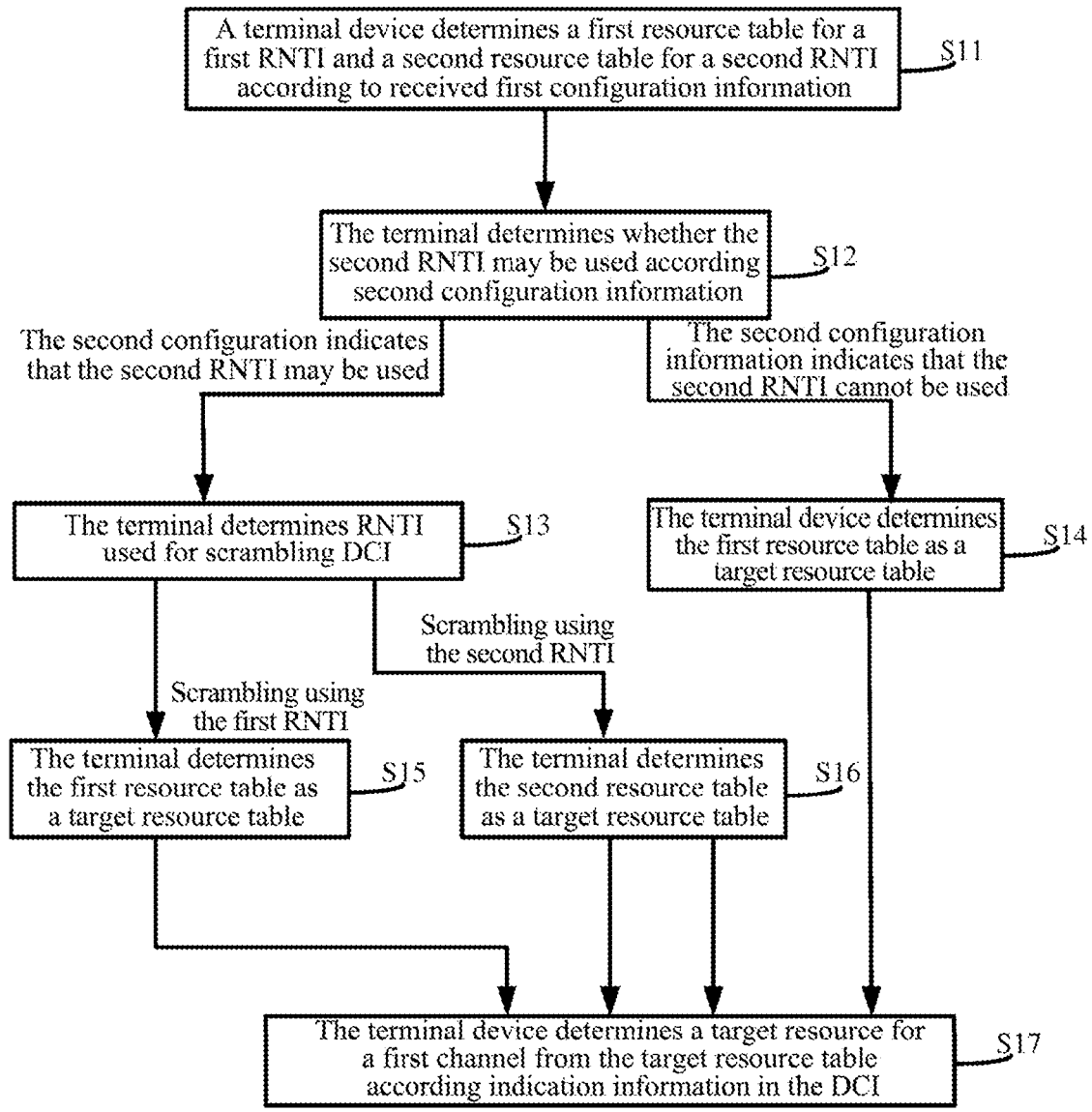
FIG. 7 is an example of a schematic flowchart of a method for wireless communication according to an implementation of the present application.

To sum up, in the Case 1, a specific implementation process of determining the target resource for the first channel may be as shown in FIG. 7, and specifically includes: S11, the terminal device receives the first configuration information sent by the network device, and determines the first resource table for the first RNTI and the second resource table for the second RNTI according to the first configuration information.

Further, in S12, the terminal device receives the second configuration information of the network device, and determines whether the second RNTI may be used according to the second configuration information.

If the second configuration information indicates that the second RNTI may be used, the flow proceeds to S13, otherwise, the flow proceeds to S14, in which the terminal device determines that the first resource table is the target resource table.

In S13, the terminal device determines the target resource table according to the RNTI used by the network device to scramble the DCI. If the DCI is scrambled using the first RNTI, the flow proceeds to S15, in which the terminal device determines that the first resource table corresponding to the first RNTI is the target resource table; or if the DCI is scrambled using the second RNTI, the flow proceeds to S16, in which the terminal device determines that the second resource table corresponding to the second RNTI is the target resource table.

Further, in S17, the terminal device determines the target resource for the first channel from the target resource table according to the indication information in the DCI.

Case 2: the at least one resource table includes a third resource table, wherein at least one resource in the third resource table is a to-be-determined type of resource.

That is, a unified third resource table is configured for different RNTIs, and the third resource table includes at least one to-be-determined type of resource, so that the terminal device may determine which type of resource the to-be-determined type of resource is, according to the RNTI for scrambling the DCI.

In a first implementation of Case 2, the terminal device determines the target resource table in the at least one resource table and the type of the resource in the target resource table according to the RNTI for scrambling the DCI, including: the terminal device determines that the third resource table is the target resource table; if the RNTI for scrambling the DCI is the first RNTI, the terminal device determines that the to-be-determined type of resource in the target resource table is the first type of resource; or if the RNTI for scrambling the DCI is the second RNTI, the terminal device determines that the to-be-determined type of resource in the target resource table is the second type of resource.

Specifically, in a case that different RNTIs correspond to a same resource table, the terminal device may directly determine the third resource table as the target resource table. Further, which type of resource the to-be-determined type of resource in the target resource table is may be determined according to the RNTI for scrambling the DCI. For example, if the RNTI is the first RNTI, the terminal device may determine that the to-be-determined type of resource is the first type resource; or, if the RNTI is the second RNTI, the terminal device may determine that the to-be-determined type of resource is the second type of resource, or the terminal device may firstly determine that the to-be-determined type of resource is a candidate second type of resource, and in a case that a certain condition is met, the candidate second type of resource is determined as the second type of resource, otherwise the candidate second type of resource is determined as the first type of resource, wherein the specific condition may refer to the relevant descriptions in the aforementioned implementations, and is not repeated here.

It should be understood that which resources in the third resource table are the to-be-determined type of resources may be configured by the network device or determined according to a preset condition. For example, it may be determined that the resource of which the starting symbol is less than a specific value is the to-be-determined type of resource. The specific implementation may refer to the relevant descriptions of the aforementioned implementations, and is not repeated here.

In some implementations, the first implementation of Case 2 may be based on such a premise that before the terminal device receives the DCI, the terminal device receives the second configuration information sent by the network device, wherein the aforementioned is used for indicating that the second RNTI may be used, that is, the first implementation of Case 2 may be the mode of determining the target resource table and the type of resource in the target resource table in a case that the second RNTI may be used.

In a second implementation of Case 2, the terminal device determines the target resource table in the at least one resource table and the type of the resource in the target resource table according to the RNTI for scrambling the DCI, including: the terminal device determines that the third resource table is the target resource table; and the terminal device determines that the to-be-determined type of resource in the target resource table is the first type of resource.

That is to say, in a case that different RNTIs correspond to a same resource table, the terminal device may directly determine that the third resource table is the target resource table and the resource in the target resource table is the first type of resource, regardless of which RNTI the RNTI used for scrambling the DCI is.

In some implementations, the second implementation of Case 2 may be based on such a premise that before the terminal device receives the DCI, the terminal device receives the second configuration information sent by the network device, wherein the second configuration information is used for indicating that the second RNTI is not used, or the terminal device does not receive the second configuration information sent by the network device, that is, the second implementation of Case 2 may be the mode of determining the target resource table and the type of resource in the target resource table when the second RNTI is not used.

To sum up, in the Case 2, a specific implementation process of determining the target resource for the first channel may be as shown in FIG. 8, and specifically includes: S21, the terminal device receives the first configuration information sent by the network device, and determines a third resource table for the first RNTI and the second RNTI according to the first configuration information, and further may determine that the third resource table is a target resource table and at least one resource in the target resource table is a to-be-determined type of resource.

Further, in S22, the terminal device receives the second configuration information of the network device, and determines whether the second RNTI may be used according to the second configuration information.

If the second configuration information indicates that the second RNTI may be used, the flow proceeds to S23, otherwise, the flow proceeds to S24, in which the terminal device determines that the to-be-determined type of resource in the target resource table is the first type of resource.

In S23, the terminal device determines which type of resource the to-be-determined type of resource in the target resource table is, according to the RNTI used by the network device to scramble the DCI. If the DCI is scrambled using the first RNTI, the flow proceeds to S25, in which the terminal device determines that the to-be-determined type of resource in the target resource table is the first type of resource, or if the DCI is scrambled using the second RNTI, the flow proceeds to S26, in which the terminal device determines that the to-be-determined type of resource in the target resource table is the second type of resource.

Further, in S27, the terminal device determines the target resource for the first channel from the target resource table according to the indication information in the DCI.

Hereinafter, the mode of determining the resource of the first channel will be described in detail with reference to specific implementations.

It should be noted that following implementations are described by taking two kinds of RNTIs including the first RNTI and the second RNTI, two types of resources including the first type of resource and the second type of resource, and the first channel is PUSCH/PDSCH as an example, but implementations of the present application are not limited to this, and implementations of the present application may also include more RNTIs for indicating more types of resources.

Implementation One: corresponding resource tables are configured for the first RNTI and the second RNTI respectively.

Specifically, the first RNTI may correspond to a first resource table, and the second RNTI may correspond to a second resource table, wherein the first resource table and the second resource table are different in reference points of starting positions of the resources. For example, the reference point of the starting position of the resource in the first resource table is a starting position of a time slot, and the reference point of the starting position of the resource in the second resource table may be the starting symbol of CORESET including the DCI, or another position in the aforementioned implementations, which are not repeated here.

As an example but not limitation, the first resource table corresponding to the first RNTI may be as shown in Table 1, and the second resource table corresponding to the second RNTI may be as shown in Table 2. Herein, the resources in the first resource table are all the first type of resources, that is, the starting symbols of the resources are calculated relative to the starting positions of the time slots, so the resources in the first resource table are more suitable for scheduling transmission of PDSCH/PUSCH with various delays, such as an eMBB service. The resources in the second resource table are all the second type of resources, that is, the starting symbols of resources are calculated relative to the starting symbols of CORESET where the DCI scheduling this resource is located, so the resources in the second resource table are more suitable for scheduling transmission of PDSCH/PUSCH with a low delay, such as a URLLC service.

TABLE 1

| Resource number | Type of resource | Starting symbol | Length (quantity of symbols) |
| --- | --- | --- | --- |
| 0. | A first type (a starting symbol of resource is relative to a starting symbol of a time slot) | Symbol 0 | 1 symbol |
| 1 | | | 2 symbols |
| 2 | | | 4 symbols |
| 3 | | Symbol 2 | 1 symbol |
| 4 | | | 2 symbols |
| 5 | | | 4 symbols |
| 6 | | Symbol 4 | 1 symbol |
| 7 | | | 2 symbols |
| 8 | | | 4 symbols |
| 9 | | Symbol 6 | 1 symbol |
| 10 | | | 2 symbols |
| 11 | | | 4 symbols |
| 12 | | Symbol 8 | 1 symbol |
| 13 | | | 2 symbols |
| 14 | | Symbol 10 | 1 symbol |
| 15 | | | 2 symbols |

TABLE 2

| Resource number | Type of resource | Starting symbol | Length (quantity of symbols) |
| --- | --- | --- | --- |
| 0 | A second type (a starting symbol of resource is relative to a starting symbol of CORESET where DCI scheduling the resource is located) | Symbol 0 | 1 symbol |
| 1 | | | 2 symbols |
| 2 | | | 3 symbols |
| 3 | | | 4 symbols |
| 4 | | Symbol 1 | 1 symbol |
| 5 | | | 2 symbols |
| 6 | | | 3 symbols |
| 7 | | | 4 symbols |
| 8 | | Symbol 2 | 1 symbol |
| 9 | | | 2 symbols |
| 10 | | | 3 symbols |
| 11 | | | 4 symbols |
| 12 | | Symbol 3 | 1 symbol |
| 13 | | | 2 symbols |
| 14 | | | 3 symbols |
| 15 | | | 4 symbols |

In some implementations, the terminal device may determine whether the second RNTI may be used according to the second configuration information, and may further determine which of the first resource table and the second resource table the target resource table is.

For example, if the second configuration information indicates that the second RNTI may be used, in this case, the terminal device determines which RNTI is used for scrambling the DCI, and if the DCI is scrambled using the first RNTI, the terminal device determines the first resource table as the target resource table; or if the DCI is scrambled using the second RNTI, the terminal device may determine the second resource table as the target resource table.

Or, if the second configuration information indicates that the second RNTI cannot be used, the terminal device may determine that the first resource table is the target resource table, regardless of whether the DCI is scrambled using the first RNTI or the second RNTI.

Further, the terminal device determines the resource for PDSCH/PUSCH transmission from the target resource table according to the indication information in the DCI. For example, if the target resource table is the first resource table, and the indication information indicates a number 10, then according to Table 1, the terminal device may determine that the starting symbol of PDSCH/PUSCH is symbol 6 in the time slot, with a length of 2 symbols. Furthermore, if the target resource table is the second resource table, and the indication information indicates a number 5, then according to Table 2, the terminal device may determine that the starting symbol of PDSCH/PUSCH is the first symbol from the starting symbol of CORESET where the DCI is located, with a length of 2 symbols.

Therefore, by configuring the terminal device with two resource tables, the network device may flexibly configure the resource for PUSCH/PDSCH according to the types of services to be transmitted through the RNTI, so that the transmission requirements of different types of services can be met. For example, the resource in the first resource table may be configured for the eMBB service, so that diversity of delay requirements of the eMBB service can be met, and configuring the resources in the second resource table for the URLLC service can reduce transmission delay of the URLLC service. At the same time, by allocating different resources to different types of services, the resource allocation of different types of services may be optimized, which is conducive to improving resource utilization rate of the communication system.

Implementation Two: corresponding resource tables for the first RNTI and the second RNTI are configured respectively.

Specifically, the first RNTI may correspond to the first resource table, and the second RNTI may correspond to the second resource table, which is different from the first implementation in that a part of resources in the second resource table are the first type of resources and a part of resources are the second type of resources. Therefore, the resources in the first resource table configured for the first RNTI are more suitable for scheduling PDSCH/PUSCH transmission with more various delays, such as the eMBB service. A part of the resources in the second resource table configured for the second RNTI are more suitable for scheduling PDSCH/PUSCH transmission with more various delays, such as the eMBB service, and another part of the resources are more suitable for PDSCH/PUSCH transmission with low delay, such as the URLLC service.

As an example, but not limitation, the first resource table may be as shown in Table 3, and the second resource table may be as shown in Table 4. Which resources in the second resource table are the second type of resources may be determined according to the configuration information of the network device, such as the first configuration information, or may be determined according to a preset condition. For example, in Table 4, the resources with resource numbers from 8 to 15 may be configured as the second type of resources according to the first configuration information, or the resources with the starting symbol numbers less than 2 may be configured as the second type of resources according to the preset condition.

TABLE 3

| Resource number | Type of resource | Starting symbol | Length (quantity of symbols) |
| --- | --- | --- | --- |
| 0 | A first type (a starting symbol of resource is relative to a starting symbol of a time slot) | Symbol 0 | 1 symbol |
| 1 | | | 2 symbols |
| 2 | | | 4 symbols |
| 3 | | Symbol 2 | 1 symbol |
| 4 | | | 2 symbols |
| 5 | | | 4 symbols |
| 6 | | Symbol 4 | 1 symbol |
| 7 | | | 2 symbols |
| 8 | | | 4 symbols |
| 9 | | Symbol 6 | 1 symbol |
| 10 | | | 2 symbols |
| 11 | | | 4 symbols |
| 12 | | Symbol 8 | 1 symbol |
| 13 | | | 2 symbols |

TABLE 3-continued

| Resource number | Type of resource | Starting symbol | Length (quantity of symbols) |
| --- | --- | --- | --- |
| 14 | | Symbol 10 | 1 symbol |
| 15 | | | 2 symbols |

TABLE 4

| Resource number | Type of resource | Starting symbol | Length (quantity of symbols) |
| --- | --- | --- | --- |
| 0 | A first type (a starting symbol of resource is relative to a starting symbol of a time slot) | Symbol 2 | 2 symbols |
| 1 | | | 4 symbols |
| 2 | | Symbol 4 | 2 symbols |
| 3 | | | 4 symbols |
| 4 | | Symbol 7 | 2 symbols |
| 5 | | | 4 symbols |
| 6 | | Symbol 10 | 2 symbols |
| 7 | | | 4 symbols |
| 8 | A second type (a starting symbol of resource is relative to a starting symbol of CORESET where DCI scheduling the resource is located) | Symbol 0 | 1 symbol |
| 9 | | | 2 symbols |
| 10 | | | 3 symbols |
| 11 | | | 4 symbols |
| 12 | | Symbol 1 | 1 symbol |
| 13 | | | 2 symbols |
| 14 | | | 3 symbols |
| 15 | | | 4 symbols |

The mode of determining the resources for PDSCH/PUSCH transmission according to Table 3 and Table 4 is similar to the implementation One, and is not repeated here.

Implementation Three: a same resource table for the first RNTI and the second RNTI is configured.

For example, as shown in Table 5, the resource table includes at least one resource of to-be-determined type, which resources in the resource table being resources of to-be-determined type is determined according to the configuration information of the network device, such as the first configuration information, or according to a preset condition. For example, the first configuration information may configure the resources with resource numbers from 0 to 7 as resources of to-be-determined type, or the resources with the resource numbers less than a specific value, such as 4, may be determined as the resources of to-be-determined type according to the preset condition.

TABLE 5

| Resource number | Type of resource | Starting symbol | Length (quantity of symbols) |
| --- | --- | --- | --- |
| 0 | To-be-determined type | Symbol 0 | 1 symbol |
| 1 | | | 2 symbols |
| 2 | | Symbol 1 | 1 symbol |
| 3 | | | 2 symbols |
| 4 | | Symbol 2 | 1 symbol |
| 5 | | | 2 symbols |
| 6 | | Symbol 3 | 1 symbol |
| 7 | | | 2 symbols |
| 8 | A first type (a starting symbol of resource is relative to a starting symbol of a time slot) | Symbol 4 | 2 symbols |
| 9 | | | 4 symbols |
| 10 | | Symbol 6 | 2 symbols |
| 11 | | | 4 symbols |
| 12 | | Symbol 8 | 2 symbols |
| 13 | | | 4 symbols |
| 14 | | Symbol 10 | 2 symbols |
| 15 | | | 4 symbols |

Further, the terminal device may determine the resource type of the to-be-determined type of resource in combination with the second configuration information. For example, if the second configuration information indicates that the second RNTI cannot be used, the terminal device may determine that the to-be-determined type of resource is the first type of resource, or if the second configuration information indicates that the second RNTI may be used, in this case, the terminal device may also further combine the RNTI for scrambling the DCI to determine which type of resource the to-be-determined type of resource is. For example, if the DCI is scrambled by using the first RNTI, the terminal device may determine that the to-be-determined type of resource is the first type of resource, or if the DCI is scrambled by using the second RNTI, the terminal device may determine that the to-be-determined type of resource is the second type of resource.

Further, the terminal device may determine the target resource for PDSCH/PUSCH transmission in the resource table in combination with the indication information in the DCI. For example, if the to-be-determined type of resource is the second type of resource, the indication information in the DCI indicates the resource number 6, then the terminal device may determine that the starting symbol of the resource, with a length of 1 symbol, for PDSCH/PUSCH transmission is a third symbol relative to the starting symbol of CORESET where the DCI is located, or if the to-be-determined type of resource is the first type of resource and at least information in the DCI indicates the resource number 3, the terminal device may determine that the starting symbol of the resource, with a length of 2 symbols, for PDSCH/PUSCH transmission is the first symbol relative to the starting position of the time slot.

The method for wireless communication according to an implementation of the present application is described in detail from a perspective of the terminal device above with reference to FIGS. 4 to 8, and a method for wireless communication according to another implementation of the present application is described in detail from a perspective of the network device below with reference to FIG. 9. It should be understood that the description of the network device side corresponds to the description of the terminal device side with each other, and the above description may be referred to for similar descriptions, which is not repeated here again to avoid repetition.

FIG. 9 is a schematic flowchart of a method 300 for wireless communication according to another implementation of the present application, and the method 300 may be performed by the terminal device in the communication system shown in FIG. 1. As shown in FIG. 9, the method 300 includes following contents.

In S310, a network device sends Downlink Control Information (DCI) scrambled by using a target Radio Network Temporary Identity (RNTI) to a terminal device, wherein the target RNTI is used for the terminal device to determine a resource for a first channel in at least one resource table, the at least one resource table contains at least two types of resources, and reference points of starting positions of the at least two types of resources are different.

Optionally, in some implementations, the method 300 further includes: the network device sends first configuration information to the terminal device, wherein the first configuration information includes the at least one resource table for determining the resource of the first channel.

Optionally, in some implementations, the at least two types of resources include a first type of resource and a second type of resource, wherein the reference point of the starting position of the first type of resource is a starting position of a time slot, and the reference point of the starting position of the second type of resource is the DCI or a time domain position of a first resource range including the DCI.

Optionally, in some implementations, the time domain position of the first resource range including the DCI is a starting symbol or an ending symbol of a Control Resource Set (CORESET) or a search space including the DCI.

Optionally, in some implementations, the at least one resource table includes a first resource table and a second resource table, wherein the first resource table corresponds to a first RNTI, the resource in the first resource table is a first type of resource, the second resource table corresponds to a second RNTI, and at least one resource in the second resource table is a second type of resource.

Optionally, in some implementations, the first RNTI is a Cell Radio Network Temporary Identity (C-RNTI), and the second RNTI is another RNTI except the C-RNTI.

Optionally, in some implementations, the at least one resource table includes a third resource table, wherein at least one resource in the third resource table is a to-be-determined type of resource.

Optionally, in some implementations, before the network device sends the Downlink Control Information (DCI) scrambled by using the target Radio Network Temporary Identity (RNTI) to the terminal device, the method further includes: the network device sends second configuration information to the terminal device, wherein the second configuration information is used for indicating whether the second RNTI may be used.

Optionally, in some implementations, the first channel is a Physical Downlink Shared Signal (PDSCH) or a Physical Uplink Shared Channel (PUSCH).

Optionally, in some implementations, the resource table at least includes following parameters: a starting symbol, a length and a mapping type of the first channel.

Method implementations of the present application are described in detail above with reference to FIGS. 4 to 9, apparatus implementations of the present application are described in detail below with reference to FIGS. 10 to 14. It should be understood that the apparatus implementations correspond to the method implementations with each other, and description of the method implementations may be referred to for similar description of the apparatus implementations.

Figure 10:
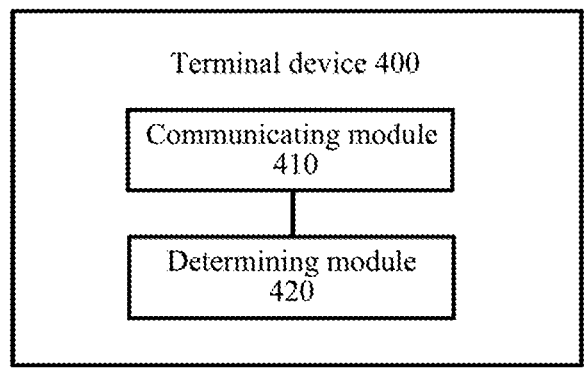
FIG. 10 is a schematic block diagram of a terminal device according to an implementation of the present application.

FIG. 10 shows a schematic block diagram of a terminal device 400 according to an implementation of the present application. As shown in FIG. 10, the terminal device 400 includes: a communicating module 410, configured to receive Downlink Control Information (DCI) sent by a network device; and a determining module 420, configured to determine a resource for a first channel in at least one resource table according to a Radio Network Temporary Identifier (RNTI) for scrambling the DCI, wherein the at least one resource table contains at least two types of resources, and reference points of starting positions of the at least two types of resources are different.

Optionally, in some implementations, the communicating module 410 is further configured to: receive first configuration information sent by the network device, wherein the first configuration information includes the at least one resource table for determining the resource of the first channel.

Optionally, in some implementations, the at least two types of resources include a first type of resource and a second type of resource, wherein a reference point of a starting position of the first type of resource is a starting position of a time slot, and a reference point of a starting position of the second type of resource is the DCI or a time domain position of a first resource range including the DCI.

Optionally, in some implementations, the time domain position of the first resource range including the DCI is a starting symbol or an ending symbol of a Control Resource Set (CORESET) or a search space including the DCI.

Optionally, in some implementations, the determining module 420 is specifically configured to: according to the RNTI for scrambling the DCI, determine a target resource table in the at least one resource table and a type of a resource in the target resource table; and according to the indication information in the DCI, determine the resource for the first channel in the target resource table.

Optionally, in some implementations, the at least one resource table includes a first resource table and a second resource table, wherein the first resource table corresponds to a first RNTI, the resource in the first resource table is a first type of resource, the second resource table corresponds to a second RNTI, and at least one resource in the second resource table is a second type of resource.

Optionally, in some implementations, the first RNTI is a Cell Radio Network Temporary identity (C-RNTI), and the second RNTI is another RNTI except the C-RNTI.

Optionally, in some implementations, the determining module 420 is further configured to: if the RNTI for scrambling the DCI is the first RNTI, determine that the first resource table is the target resource table and the resource in the first resource table is the first type of resource; or, if the RNTI for scrambling the DCI is the second RNTI, determine that the second resource table is the target resource table and at least one resource in the second resource table is a candidate second type of resource.

Optionally, in some implementations, the determining module 420 is further configured to: determine that the first resource table is the target resource table.

Optionally, in some implementations, the at least one resource table includes a third resource table, wherein at least one resource in the third resource table is a to-be-determined type of resource.

Optionally, in some implementations, the determining module 420 is further configured to determine that the third resource table is the target resource table; if the RNTI for scrambling the DCI is the first RNTI, determine that the to-be-determined type of resource in the target resource table is the first type of resource; or if the RNTI for scrambling the DCI is the second RNTI, determine that the to-be-determined type of resource in the target resource table is the second type of resource.

Optionally, in some implementations, the determining module 420 is further configured to: determine that the third resource table is the target resource table; and determine that the to-be-determined type of resource in the target resource table is the first type of resource.

Optionally, in some implementations, the communicating module is further configured to: receive second configuration information sent by the network device before receiving the Downlink Control Information (DCI) sent by the network device, wherein the second configuration information is used for indicating that the second RNTI may be used.

Optionally, in some implementations, the communicating module is further configured to: receive the second configuration information sent by the network device before receiving the Downlink Control Information (DCI) sent by the network device, wherein the second configuration information is used for indicating that the second RNTI is not used; or before receiving the Downlink Control Information (DCI) sent by the network device, the second configuration information sent by the network device is not received.

Optionally, in some implementations, the determining module 420 is further configured to: determine the candidate second type of resource as the second type of resource; or when a time-slot-level offset of the DCI is zero, determine the candidate second type of resource as the second type of resource.

Optionally, in some implementations, the determining module 420 is further configured to: determine the candidate second type of resource in the target resource table according to configuration of the network device or a preset condition.

Optionally, in some implementations, the preset condition is preset on the terminal device, and the preset condition is to determine a resource of which a starting symbol is less than a specific value as the candidate second type of resource.

Optionally, in some implementations, it is characterized that the first channel is a Physical Downlink Shared Signal (PDSCH) or a Physical Uplink Shared Channel (PUSCH).

Optionally, in some implementations, the resource table at least includes following parameters: a starting symbol of the first channel and a length.

Optionally, in some implementations, the resource table further includes a mapping type of the first channel.

Specifically, the terminal device 400 may correspond to (e.g., may be configured in or be itself) the terminal device described in the above method 200, and various modules or units in the terminal device 400 are respectively configured to perform various actions or processing processes performed by the terminal device in the above method 200. Herein, in order to avoid redundancy, detailed description thereof is omitted.

Figure 11:
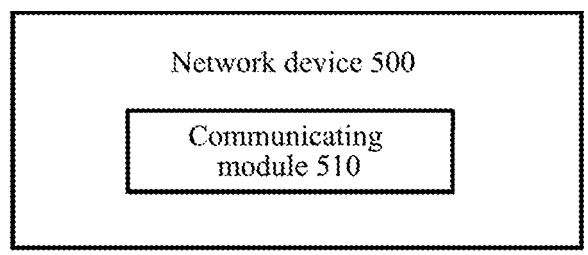
FIG. 11 is a schematic block diagram of a network device according to an implementation of the present application.

FIG. 11 is a schematic block diagram of a network device according to an implementation of the present application. A network device 500 in FIG. 11 includes: a communicating module 510, configured to send Downlink Control Information (DCI) scrambled by using a target Radio Network Temporary Identity (RNTI) to a terminal device, wherein the target RNTI is used for the terminal device to determine a resource for the first channel in at least one resource table, the at least one resource table contains at least two types of resources, and reference points of starting positions of the at least two types of resources are different.

Optionally, in some implementations, the communicating module 510 is further configured to: send first configuration information to the terminal device, wherein the first configuration information includes the at least one resource table for determining the resource of the first channel.

Optionally, in some implementations, the type of resource is a first type of resource or a second type of resource, wherein a reference point of a starting position of the first type of resource is a starting position of a time slot, and a reference point of a starting position of the second type of resource is the DCI or a time domain position of a first resource range including the DCI.

Optionally, in some implementations, the time domain position of the first resource range including the DCI is a starting symbol or an ending symbol of a Control Resource Set (CORESET) or a search space including the DCI.

Optionally, in some implementations, the at least one resource table includes a first resource table and a second resource table, wherein the first resource table corresponds to a first RNTI, the resource in the first resource table is a first type of resource, the second resource table corresponds to a second RNTI, and at least one resource in the second resource table is a second type of resource.

Optionally, in some implementations, the first RNTI is a Cell Radio Network Temporary Identity (C-RNTI), and the second RNTI is another RNTI except the C-RNTI.

Optionally, in some implementations, the at least one resource table includes a third resource table, wherein at least one resource in the third resource table is a to-be-determined type of resource.

Optionally, in some implementations, the communicating module 510 is further configured to: send second configuration information to the terminal device, wherein the second configuration information is used for indicating whether the second RNTI may be used.

Optionally, in some implementations, the first channel is a Physical Downlink Shared Channel (PDSCH) or a Physical Uplink Shared Channel (PUSCH).

Optionally, in some implementations, the resource table at least includes following parameters: a starting symbol, a length and a mapping type of the first channel.

Specifically, the network device 500 may correspond to (e.g., may be configured in or be itself) the network device described in the above method 300, and various modules or units in the network device 500 are respectively configured to perform various actions or processing processes performed by the network device in the above method 300. Herein, in order to avoid redundancy, detailed description thereof is omitted.

Figure 12:
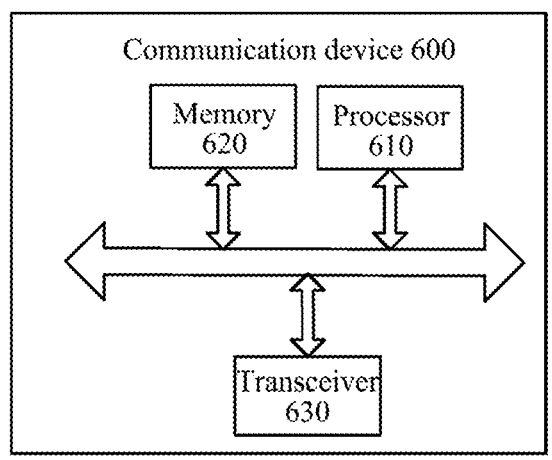
FIG. 12 is a schematic block diagram of a communication system according to an implementation of the present application.

FIG. 12 is a schematic diagram of structure of a communication device 600 according to an implementation of the present application. The communication device 600 shown in FIG. 12 includes a processor 610. The processor 610 may call and run a computer program from a memory to implement the method in the implementation of the present application.

Optionally, as shown in FIG. 12, the communication device 600 may further include a memory 620. Herein, the processor 610 may call and run a computer program from the memory 620 to implement the method in the implementation of the present application.

Herein, the memory 620 may be a separate device independent of the processor 610 or may be integrated in the processor 610.

Optionally, as shown in FIG. 12, the communication device 600 may further include a transceiver 630, and the processor 610 may control the transceiver 630 to communicate with another device. Specifically, information or data may be sent to another device or information or data sent by another device is received.

Herein, the transceiver 630 may include a transmitter and a receiver. The transceiver 630 may also further include antennas, and a quantity of antennas may be one or more.

Optionally, the communication device 600 may be specifically a network device of an implementation of the present application, and the communication device 600 may implement the corresponding processes implemented by the network device in various methods of the implementations of the present application, which is not repeated here again for brevity.

Optionally, the communication device 600 may be specifically a mobile terminal/terminal device of an implementation of the present application, and the communication device 600 may implement the corresponding processes implemented by the mobile terminal/terminal device in the various methods of the implementations of the present application, which is not repeated here again for brevity.

Figure 13:
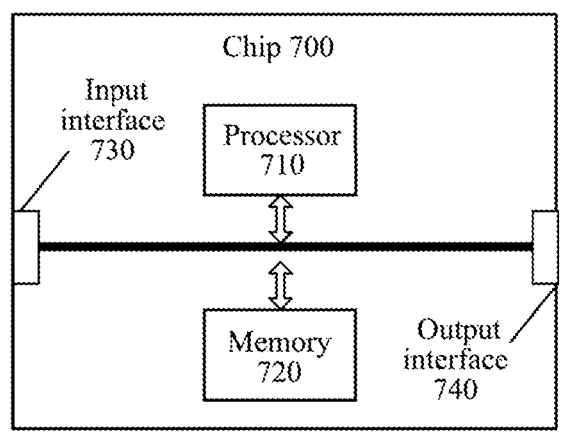
FIG. 13 is a schematic block diagram of a chip according to an implementation of the present application.

FIG. 13 is a schematic diagram of structure of a chip of an implementation of the present application. A chip 700 shown in FIG. 13 includes a processor 710. The processor 710 may call and run a computer program from a memory to implement the method in the implementation of the present application.

Optionally, as shown in FIG. 13, the chip 700 may further include a memory 720. Herein, the processor 710 may call and run a computer program from the memory 720 to implement the method in the implementation of the present application.

Herein, the memory 720 may be a separate device independent of the processor 710 or may be integrated in the processor 710.

Optionally, the chip 700 may further include an input interface 730. Herein, the processor 710 may control the input interface 730 to communicate with another device or chip. Specifically, information or data sent by another device or chip may be acquired.

Optionally, the chip 700 may further include an output interface 740. Herein, the processor 710 may control the output interface 740 to communicate with another device or chip. Specifically, information or data may be output to another device or chip.

Optionally, the chip may be applied in a network device of the implementation of the present application, and the chip may implement the corresponding processes implemented by the network device in various methods of the implementations of the present application, which is not repeated here again for brevity.

Optionally, the chip may be applied in a mobile terminal/terminal device of the implementation of the present application, and the chip may implement the corresponding processes implemented by the mobile terminal/terminal device in the various methods of the implementations of the present application, which is not repeated here again for brevity.

It should be understood that the chip mentioned in the implementation of the present application may also be referred to as a system-level chip, a system chip, a chip system or a system chip-on-chip, etc.

Figure 14:
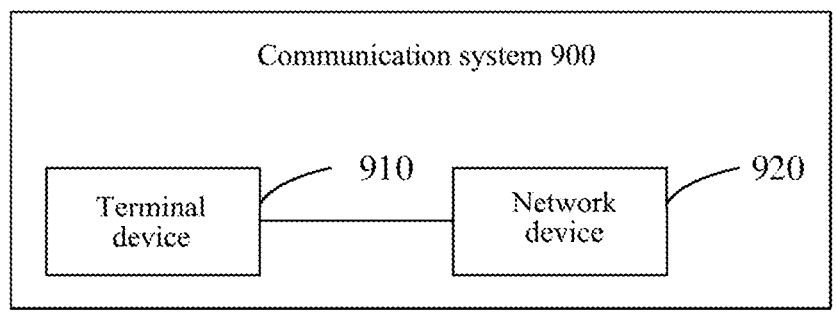
FIG. 14 is a schematic block diagram of a communication system according to an implementation of the present application.

FIG. 14 is a schematic block diagram of a communication system 900 according to an implementation of the present application. As shown in FIG. 14, the communication system 900 includes a terminal device 910 and a network device 920.

Herein, the terminal device 910 may be configured to implement the corresponding functions implemented by the terminal device in the above method, and the network device 920 may be configured to implement the corresponding functions implemented by the network device in the above method, which is not repeated here again for brevity.

It should be understood that, the processor in the implementation of the present application may be an integrated circuit chip having a signal processing capability. In an implementation process, the acts of the above method implementations may be completed by an integrated logic circuit of hardware in the processor or instructions in a form of software. The above processor may be a general purpose processor, a Digital Signal Processing (DSP), an Application Specific Integrated Circuit (ASIC), a Field Programmable Gate Array (FPGA) or another programmable logic device, a discrete gate or a transistor logic device, or a discrete hardware component. Methods, acts and logical block diagrams disclosed in the implementations of the present application may be implemented or performed. The general purpose processor may be a microprocessor, or the processor may be any conventional processor or the like. The acts of the method disclosed with reference to the implementation of the present application may be directly embodied as executed and completed by a hardware decoding processor, or may be executed and completed by a combination of hardware and software modules in a decoding processor. The software modules may be located in a storage medium commonly used in the art, such as a random access memory, a flash memory, a read-only memory, a programmable read-only memory or an electrically erasable programmable memory, a register, etc. The storage medium is located in a memory, and the processor reads information in the memory and completes the acts of the above method in combination with its hardware.

It may be understood that, the memory in the implementation of the present application may be a volatile memory or a non-volatile memory, or may include both a volatile memory and a non-volatile memory. Herein, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. Through exemplary but not limitative description, many forms of RAMs may be used, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a synchronous link dynamic random access memory (Synchlink DRAM, SLDRAM), and a direct internal memory bus random access memory (Direct Rambus RAM, DR RAM). It should be noted that the memory in the systems and the methods described in this specification are aimed at including but being not limited to these and any memory of another proper type.

It should be understood that, the above memory is an example for illustration and should not be construed as limiting. For example, the memory in the implementations of the present application may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SL-DRAM), a Direct Rambus RAM (DR RAM), or the like. That is, memories in the implementations of the present application are aimed at including, but not limited to, these and any memory of another proper type.

An implementation of the present application further provides a computer readable storage medium, configured to store a computer program.

Optionally, the computer readable storage medium may be applied in a network device of an implementation of the present application, and the computer program causes a computer to perform the corresponding processes implemented by the network device in various methods of implementations of the present application, which is not repeated here again for brevity.

Optionally, the computer readable storage medium may be applied in a mobile terminal/terminal device of an implementation of the present application, and the computer program causes the computer to perform the corresponding processes implemented by the mobile terminal/terminal device in various methods of implementations of the present application, which is not repeated here again for brevity.

An implementation of the present application also provides a computer program product, including computer program instructions.

Optionally, the computer program product may be applied in a network device of an implementation of the present application, and the computer program instructions cause a computer to perform the corresponding processes implemented by the network device in various methods of implementations of the present application, which is not repeated here again for brevity.

Optionally, the computer program product may be applied in a mobile terminal/terminal device of an implementation of the present application, and the computer program instructions cause the computer to perform the corresponding processes implemented by the mobile terminal/terminal device in various methods of implementations of the present application, which is not repeated here again for brevity.

An implementation of the present application also provides a computer program.

Optionally, the computer program may be applied in a network device of an implementation of the present application. When the computer program is run on the computer, the computer is caused to perform the corresponding processes implemented by the network device in various methods of implementations of the present application, which is not repeated here again for brevity.

Optionally, the computer program may be applied in a mobile terminal/terminal device of an implementation of the present application. When the computer program is run on the computer, the computer is caused to perform the corresponding processes implemented by the mobile terminal/terminal device in various methods of implementations of the present application, which is not repeated here again for brevity.

Those of ordinary skill in the art may recognize that the exemplary elements and algorithm acts described in combination with the implementations disclosed herein can be implemented in electronic hardware, or a combination of computer software and electronic hardware. Whether these functions are executed in hardware or software depends on a particular application and a design constraint condition of a technical solution. Skilled artisans may use different methods to implement the described functions in respect to each particular application, but such implementation should not be considered to be beyond the scope of the present application.

Those skilled in the art may clearly learn that for convenience and conciseness of description, the specific working processes of the systems, apparatuses and units described above may refer to the corresponding processes in the aforementioned method implementations and is not repeated here again.

In several implementations provided by the present application, it should be understood that the disclosed systems, apparatuses and methods may be implemented in another mode. For example, the apparatus implementations described above are only illustrative, for example, the division of the units is only a logical function division, and there may be another division mode in an actual implementation, for example, multiple units or components may be combined or integrated into another system, or some features may be ignored or not executed. On the other hand, mutual coupling or direct coupling or communication connection shown or discussed may be indirect coupling or communication connection through some interfaces, apparatuses or units, or may be in electrical, mechanical or another form.

The unit described as a separate component may or may not be physically separated, and the component shown as a unit may or may not be a physical unit, i.e., it may be located in one place or may be distributed over multiple network units. Part or all of the units therein may be selected according to an actual requirement to achieve a purpose of a solution of the implementation.

In addition, functional units in various implementations of the present application may be integrated in one processing unit, or various units may be physically present separately, or two or more units may be integrated in one unit.

The functions may be stored in a computer readable storage medium if realized in a form of software functional units and sold or used as a separate product. Based on this understanding, the technical solution of the present application, in essence, or the part contributing to the prior art, or the part of the technical solution, may be embodied in a form of a software product. The computer software product is stored in a storage medium, including a number of instructions for causing a computer device (which may be a personal computer, a server, or a network device, or the like) to perform all or part of the acts of the methods described in various implementations of the present application. And the aforementioned storage medium includes: various kinds of media that may store program codes, such as a USB flash drive, a removable hard disk, a Read-Only Memory (ROM), a Random Access Memory (RAM), a magnetic disk, or an optical disc, etc.

What are described above are merely specific implementations of the present application, but the protection scope of the present application is not limited thereto. Any variation or substitution that may be easily conceived by a person skilled in the art within the technical scope disclosed by the present application shall be included within the protection scope of the present application. Therefore, the protection scope of the present application shall be determined by the protection scope of the claims.

What is claimed is:

1. A method for wireless communication, comprising:
    receiving, by a terminal device, Downlink Control Information (DCI) sent by a network device; and
    determining, by the terminal device, a resource for a first channel in at least one resource table according to a Radio Network Temporary Identity (RNTI) for scrambling the DCI, wherein the at least one resource table contains at least two types of resources, and reference points of starting positions of the at least two types of resources are different;
    wherein determining, by the terminal device, the resource for the first channel in the at least one resource table according to the Radio Network Temporary Identity (RNTI) for scrambling the DCI, comprises:
    determining, by the terminal device, a target resource table in the at least one resource table and a type of a resource in the target resource table according to the RNTI for scrambling the DCI, and
    determining, by the terminal device, the resource for the first channel in the target resource table according to indication information in the DCI; wherein the at least one resource table comprises a first resource table and a second resource table, wherein, the first resource table corresponds to a first RNTI, a resource in the first resource table is a first type of resource, the second resource table corresponds to a second RNTI, and at least one resource in the second resource table is a second type of resource;
    wherein determining, by the terminal device, the target resource table in the at least one resource table and the type of the resource in the target resource table according to the RNTI for scrambling the DCI, comprises:
    if the RNTI for scrambling the DCI is the first RNTI, determining, by the terminal device that the first resource table is the target resource table and the resource in the first resource table is the first type of resource; or
    if the RNTI for scrambling the DCI is the second RNTI, determining, by the terminal device, that the second resource table is the target resource table, and at least one resource in the second resource table is a candidate second type of resource; or
    wherein determining, by the terminal device, the target resource table in the at least one resource table and the type of the resource in the target resource table according to the RNTI for scrambling the DCI, comprises:
    determining, by the terminal device, that the first resource table is the target resource table;
    wherein the method further comprises:
    determining, by the terminal device, the candidate second type of resource in the target resource table according to configuration of the network device or a preset condition; wherein the preset condition is preset on the terminal device; wherein the preset condition is to determine a resource of which a starting symbol is less than a specific value as the candidate second type of resource.

2. The method of claim 1, wherein the method further comprises:
    receiving, by the terminal device, first configuration information sent by the network device, wherein the first configuration information comprises the at least one resource table for determining the resource of the first channel.

3. The method of claim 1, wherein the at least two types of resources comprise a first type of resource and a second type of resource, wherein a reference point of a starting position of the first type of resource is a starting position of a time slot, and a reference point of a starting position of the second type of resource is the DCI or a time domain position of a first resource range comprising the DCI.

4. The method of claim 3, wherein the time domain position of the first resource range comprising the DCI is a starting symbol or an ending symbol of a Control Resource Set (CORESET) or a search space comprising the DCI.

5. The method of claim 1, wherein the first RNTI is a Cell Radio Network Temporary Identity (C-RNTI), and the second RNTI is another RNTI except the C-RNTI.

6. The method of claim 1, wherein the at least one resource table comprises a third resource table, wherein at least one resource in the third resource table is a to-be-determined type of resource.

7. The method of claim 6, wherein determining, by the terminal device, the target resource table in the at least one resource table and the type of the resource in the target resource table according to the RNTI for scrambling the DCI, comprises:
    determining, by the terminal device, that the third resource table is the target resource table;
    if the RNTI for scrambling the DCI is the first RNTI, determining, by the terminal device, that the to-be-determined type of resource in the target resource table is the first type of resource; or
    if the RNTI for scrambling the DCI is the second RNTI, determining, by the terminal device, that the to-be-determined type of resource in the target resource table is the second type of resource; or
    wherein determining, by the terminal device, the target resource table in the at least one resource table and the type of the resource in the target resource table according to the RNTI for scrambling the DCI, comprises:

determining, by the terminal device, that the third resource table is the target resource table; and determining, by the terminal device, that the to-be-determined type of resource in the target resource table is the first type of resource.

8. The method of claim 1, wherein before receiving, by the terminal device, the Downlink Control Information (DCI) sent by the network device, the method further comprises:

receiving, by the terminal device, second configuration information sent by the network device, wherein the second configuration information is used for indicating that the second RNTI is able to be used.

9. The method of claim 6, wherein before receiving, by the terminal device, the Downlink Control Information (DCI) sent by the network device, the method further comprises:

receiving, by the first terminal device, second configuration information sent by the network device, wherein the second configuration information is used for indicating that the second RNTI is not used; or not receiving, by the terminal device, second configuration information sent by the network device.

10. The method of claim 1, wherein the method further comprises:

determining, by the terminal device, the candidate second type of resource as the second type of resource; or determining, by the terminal device, the candidate second type of resource as the second type of resource when a time-slot-level offset of the DCI is zero.

11. A method for wireless communication, comprising:

sending, by a network device, Downlink Control Information (DCI) scrambled by using a target Radio Network Temporary Identity (RNTI) to a terminal device, wherein the target RNTI is used for the terminal device to determine a resource for a first channel in at least one resource table, the at least one resource table contains at least two types of resources, and reference points of starting positions of the at least two types of resources are different; wherein the target RNTI is further used for the terminal device to determine a target resource table in the at least one resource table and a type of a resource for the first channel in the target resource table; wherein the at least one resource table comprises a first resource table and a second resource table, wherein, the first resource table corresponds to a first RNTI, a resource in the first resource table is a first type of resource, the second resource table corresponds to a second RNTI, and at least one resource in the second resource table is a second type of resource; wherein if the target RNTI is the first RNTI, the first resource table is the target resource table and the resource in the first resource table is the first type of resource; or if the target RNTI is the second RNTI, the second resource table is the target resource table, and at least one resource in the second resource table is a candidate second type of resource;

wherein, the candidate second type of resource in the target resource table is determined according to configuration of the network device or a preset condition; wherein the preset condition is preset on the terminal device; wherein the preset condition is to determine a resource of which a starting symbol is less than a specific value as the candidate second type of resource.

12. The method of claim 11, wherein the method further comprises:

sending, by the network device, first configuration information to the terminal device, wherein the first configuration information comprises the at least one resource table for determining the resource of the first channel.

13. The method of claim 11, wherein before sending, by the network device, the Downlink Control Information (DCI) scrambled by using the target Radio Network Temporary Identity (RNTI) to the terminal device, the method further comprises:

sending, by the network device, second configuration information to the terminal device, wherein the second configuration information is used for indicating whether a second RNTI is able to be used.

14. The method of claim 11, wherein the first channel is a Physical Downlink Shared Channel (PDSCH) or a Physical Uplink Shared Channel (PUSCH).

15. The method of claim 11, wherein the resource table comprises at least one of following parameters: a starting symbol, a length and a mapping type of the first channel.

16. A terminal device comprising: a memory and a processor, wherein the processor is configured to execute instructions stored in the memory to perform following operations:

receiving Downlink Control Information (DCI) sent by a network device; and determining a resource for a first channel in at least one resource table according to a Radio Network Temporary Identity (RNTI) for scrambling the DCI, wherein the at least one resource table contains at least two types of resources, and reference points of starting positions of the at least two types of resources are different; wherein determining a resource for a first channel in at least one resource table according to a Radio Network Temporary Identity (RNTI) for scrambling the DCI comprise:

determining a target resource table in the at least one resource table and a type of a resource in the target resource table according to the RNTI for scrambling the DCI; and determining the resource for the first channel in the target resource table according to indication information in the DCI; wherein the at least one resource table comprises a first resource table and a second resource table, wherein, the first resource table corresponds to a first RNTI, a resource in the first resource table is a first type of resource, the second resource table corresponds to a second RNTI, and at least one resource in the second resource table is a second type of resource;

wherein determining the target resource table in the at least one resource table and the type of the resource in the target resource table according to the RNTI for scrambling the DCI, comprises:

if the RNTI for scrambling the DCI is the first RNTI, determining that the first resource table is the target resource table and the resource in the first resource table is the first type of resource;

or if the RNTI for scrambling the DCI is the second RNTI, determining that the second resource table is the target resource table, and at least one resource in the second resource table is a candidate second type of resource; or determining that the first resource table is the target resource table;

wherein the processor is further configured to execute instructions stored in the memory to perform following operations: determining the candidate second type of resource in the target resource table according to configuration of the network device or a preset condition; wherein the preset condition is preset on the terminal device; wherein the preset condition is to determine a resource of which a starting symbol is less than a specific value as the candidate second type of resource.

* * * * *